Oct. 23, 1962  J. W. ANDERSON  3,059,484
MOTION-TRANSMITTING MECHANISM
Filed Jan. 29, 1960
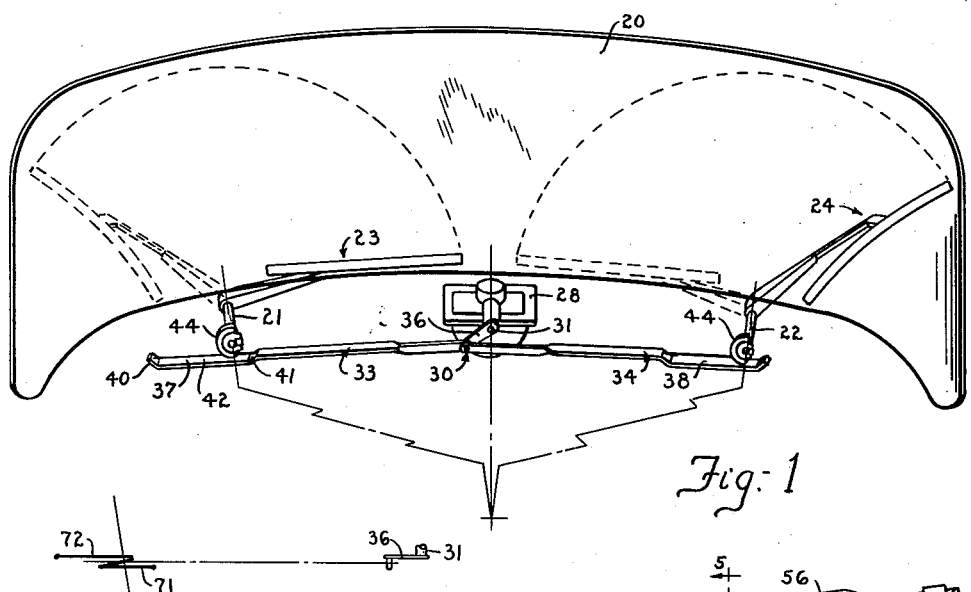
Fig. 1
Fig. 2
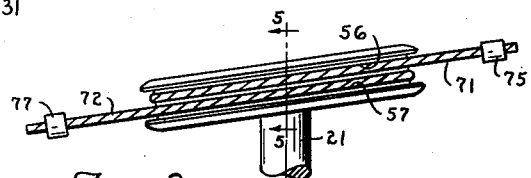
Fig. 3
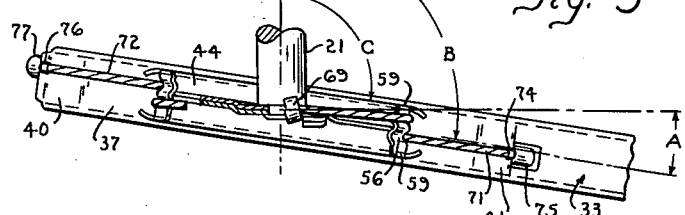
Fig. 4
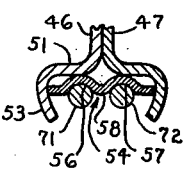
Fig. 5
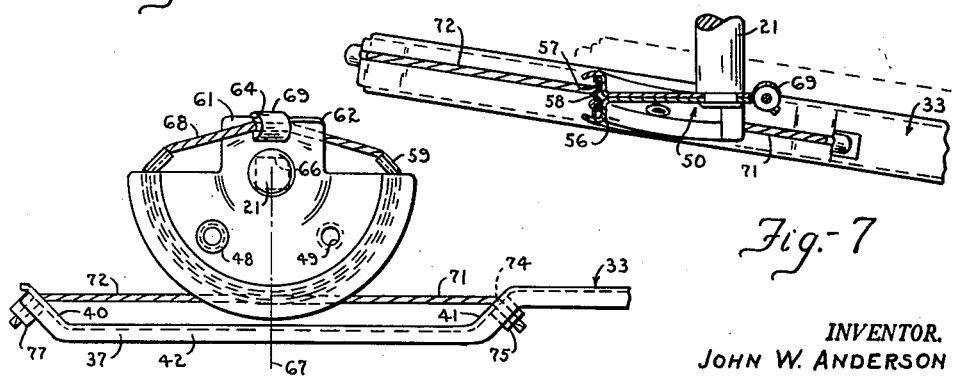
Fig. 6
Fig. 7
INVENTOR.
JOHN W. ANDERSON
BY W. E. Recktenwald
C. S. Penfold
ATTORNEY

United States Patent Office 3,059,484
Patented Oct. 23, 1962

3,059,484
MOTION-TRANSMITTING MECHANISM
John W. Anderson, 578 Broadway, Gary, Ind.
Filed Jan. 29, 1960, Ser. No. 5,382
8 Claims. (Cl. 74—82)

This invention relates to windshield wiper mechanisms and more particularly is directed to an improved device for converting reciprocating motion to oscillating motion.

For many years two principal systems have been employed in the automotive industry for converting the motion created at the output end of a vacuum, air or electric motor to the oscillating motion of a pair of windshield wiper arm-and-blade subassemblies. One system is commonly called the "bar linkage" system which, stated broadly, employs rigid links and cranks between the output end of the motor and the pivot shaft. The other system is commonly called the "cable drive" system which employs pulleys and cables to transmit the motion from the output end of the motor to the arm pivot shaft. Each prior system is repleat with disadvantages that have been substantially overcome with the device shown and described in my U.S. Patent No. 2,901,764, issued September 1, 1959. The present invention is an improvement upon the basic structure set out in my just-enumerated patent.

The present invention relates to a novel motion-transmitting mechanism that has substantially reduced side thrust and abrasion between the operative parts of the mechanism, and has substantially improved efficiency of operation—all without materially, if at all, increasing the cost of the finished product.

It is, therefore, a principal object of this invention to provide an improved motion-transmitting mechanism having substantially direct or straight-line transmission of forces between the principal operating parts so as to reduce the side or end thrust therebetween.

It is an object of this invention to provide an improved motion-transmitting mechanism wherein the force applied by the output end of the power source to the pulleylike member lies in a generally common plane.

It is another object of this invention to provide an improved motion-transmitting mechanism having a novel arrangement of parts for producing a more efficient transmission of forces therebetween.

It is a still further object of this invention to provide a motion-transmitting mechanism having improved relationships between the link and pulley for substantially reducing friction and abrasion therebetween.

A still further object of this invention is to provide a motion-transmitting mechanism of relatively simple construction and operation, which is not only economical to manufacture, but which is efficient in use, uniform in operation, having few operating parts, and unlikely to get out of repair.

These and other objects and advantages of the invention will become apparent after the description hereinafter set forth is considered in conjunction with the drawing annexed hereto.

FIGURE 1 is an elevational view of the rear side of a windshield illustrating the apparatus embodying the invention as applied thereto;

FIGURE 2 is a schematic top plan view of the relative relationship of the respective parts of the invention;

FIGURE 3 is a bottom plan view of the cable-and-pulley assembly of FIGURE 6;

FIGURE 4 is a top plan view of the assembly of FIGURE 6;

FIGURE 5 is a partial cross-sectional view taken along the line 5—5 of FIGURE 3;

FIGURE 6 is an elevational view of the link-and-pulley arrangement embodying my invention; and FIGURE 7 is a top view similar to FIGURE 4 with the pulley rotated approximately 90 degrees from the position of FIGURES 4 and 6.

Referring to the drawings, wherein the same reference numeral refers to the same part throughout the several views, a windshield 20 is illustrated as having a pair of pivot shafts 21, 22 mounted along the lower edge portion thereof for supporting a pair of windshield wiper arm-and-blade subassemblies 23 and 24, respectively, for oscillatory movement across the surface of the windshield. A power unit 28 is operatively connected to the respective shafts 21, 22 through a motion-transmitting unit 30 whereby the oscillatory or rotary motion of the output 31 of the power unit or wiper motor 28 is converted to the oscillatory motion of the wiper arm-and-blade subassemblies. The power unit 28 is illustrated as a vacuum motor, although it is within the scope of this invention to make use of an electric motor, an air motor or any other suitable type motor without departing from the spirit of the invention.

The motion-transmitting unit 30 is comprised of a pair of elongated link members 33, 34 which are channel-shaped in cross section in such a way as to have substantial rigidity, both in the longitudinal and in the transverse directions. The inner ends of the respective link members 33, 34 are pivotally connected together and are pivotally connected to one end portion of a crank member 36 extending between the ends of the link members and the output 31 of the power unit. Each link member 33, 34 has an outer end portion 37, 38 which is offset in shape with respect to the rest of the link member. Each offset portion 37, 38 has sloping end portions 40 and 41 integrally connected with the opposite ends of an elongate intermediate base portion 42.

A pulleylike member 44, which may be die-cast, stamped or the like, is keyed to the inner end portion of each shaft 21 and 22. The shafts 21 and 22 are mounted in sleeve bearings (not shown) extending through the cowl of the motor vehicle. Each pulleylike member 44 is shown as comprised of a pair of stamped substantially semicircular halves 46 and 47 which are held in abutting face-to-face relationship by the interfitting peened over lugs 48 passing through apertures 49. Each half 46 and 47 is provided with a central web portion 50 which has a transversely disposed peripheral shoulder 51 extending outwardly along substantially the outer edge thereof. A retaining flange 53 extends radially outward from said shoulder 51 which, when the halves 46, 47 are fastened together, serves to retain a raceway insert or member 54 from sidewise movement relative to the halves of the pulley.

The raceway member 54 is provided with a pair of spaced parallel grooves 56, 57 which are separated by a raised ledge 58. The opposite side edges of the ends of the raceway member 54 have laterally extending ears 59 which are adapted to engage with and overlap the respective ends of the flanges 53 of the peripheral portion of the halves 46, 47 to further assist in retaining the raceway 54 in assembled relationship with the pulley 44. A pair of tabs 61, 62 integrally formed on the halves 46, 47 are spaced apart and offset in opposite directions from each other so as to provide an opening 64 therebetween. A noncircular opening 66 is formed through the halves 46, 47 at the geometric center of the semicircular pulley 44 so as to be positively engaged with a coacting surface on the ends of the pivot shafts 21 or 22 for keying the pulleylike member 44 to said pivot shaft. The web 50 of the pulley 44 is divided into two portions, each portion lying in a different plane. The area of the web surrounding the geometric center of the pulley 44 lies in one plane, hereinafter referred to as the central plane, which is substantially perpendicular to the axis of the associated pivot shaft 21. The remaining area of the web 50, that is the portion extending radially inwardly from the shoulder 51 lies in another plane which is angularly disposed with respect to the above-described central plane. The above two planes intersect along a median line designated 67 (FIGURE 6) which constitutes the vertical center line of the pulley 44. The angle between the respective planes is designated generally "A," as viewed in FIGURE 4, for a purpose to be more fully described hereinafter.

A lug 69 is securely clamped near the mid-point of a cable member 68 which has one end portion 71 fastened to the sloping portion 41 of the portion 37 of the link member and has its other end portion 72 fastened to the sloping portion 40 at the outer end of the portion 37 of the link member. The cable is wrapped around the pulley 44 with the respective reaches thereof extending tangentially from the surface of the raceway 54 of the pulley to the points of connection with the sloping surfaces 40 and 41. The lug 69 is seated in the opening 64 between the tabs 61 and 62 so as to prevent slipping of the cable 68 relative to the pulley. The end 71 of the cable passes through an aperture 74 in the sloping surface 41 and has a lug 75 securely clamped to the end of the cable so as to abut against the undersurface of the sloping portion for securing one end of the cable to the link. The other end 72 of the cable passes through a slot 76 formed in the outer end of the sloping portion 40 of the link such that a lug 77 clamped to the end 72 of the cable abuts against the undersurface of the sloping portion 40 for holding the cable secured to the link 33. The lug 77 is clamped to the cable after the cable has been stretched a predetermined amount so that the cable operates under tension in its operation with respect to the pulley 44. The cable 68 from the end 71 extends into nesting relation in the groove 56 in the raceway 54 and continues around the pulley through the lug 69, into the groove 57 and off the pulley at the end 72. The flanges 53 of the pulley are suspended relative to the base 42 of the link 33 so that generally speaking, in the illustrated form, there is no actual contact between the pulley and the link.

It is to be understood that the operative connection between the pulley and the link member, as well as the adjustment of the cable on the link member and pulley described above, is for illustration purposes only. The invention contemplates that the pulley and link member be operatively connected by wrapping the cable at least partially around the pulley and attaching the cable ends to the link member so that reciprocation of the link member oscillates the pulley.

The power unit 28 may be any type, but for purposes of illustration is shown as comprising the oscillating type of vacuum motor which is adapted to oscillate the output shaft 31. The motor 28 is operatively connected with the motion-transmitting unit 30 in such a way as to reciprocably drive the unit 30 during the wiping operation and to move the unit 30 and arm-and-blade subassemblies into parked position when the motor is shut off. The link 36 is keyed to the shaft 31 so as to be oscillatably driven by said vacuum motor. As the wiper motor 31 is oscillated, the link 36 reciprocates the unit 30 and drives the pulleys 44, shafts 21, 22 and arm-and-blade subassemblies 23, 24 in an oscillatory manner. Since the pulleys 44 both operatively engage the links 33, 34 of unit 30 on the same relative side of the link, the arm-and-blade subassemblies are driven in a "tandem" wipe. A tandem wipe is understood to mean a condition wherein the arm-and-blade subassemblies 23 and 24 both move together in the same direction, i.e. both to the left and then both to the right.

The pulleylike members 44 are fastened to the pivot shafts 21, 22 for oscillatory movement about the axis of the respective shaft. The operative relationship between one pulley like member 44 and the unit 30 will be discussed, it being understood that the same condition prevails with respect to the other pulleylike member 44. Due to the limitations created by automotive body design and the like, it is virtually impossible to so position the output of the wiper motor 28 relative to the pulleylike members 44 in such a way that movement of the links 33, 34 is at a right angle to the axis of the pivot shafts 21 and 22. That is, as best shown in FIGURE 4, the axis of the link 33 crosses the axis of the pivot shaft 21 at an angle designated generally as "B," which angle varies between different makes and different models of vehicles. The angle "B" is shown as obtuse, but it could be acute without departing from the spirit of the invention. The portion of the web 50 lying in the central plane of the pulleylike member 44 lies at substantially a right angle to the axis of the pivot shaft 21. The plane defining the rest of the pulleylike member 44, which includes the cable-receiving raceway member 54, lies at an angle "C" to the axis of the pivot shaft. Angle "C" is equal to angle "A" plus 90 degrees. Angles "A," "B" and "C" are measured on the side of the pivot shaft closest to the wiper motor 28, and are such that the angle "B" between the axis of the link 33 and the pivot shaft 21 is substantially equal to angle "C" between the plane of the peripheral portion of the pulley 44 and said pivot shaft. This above-described condition prevails when the pulley 44 is in the position of FIGURES 3, 4 and 6 with the center line 67 of the pulley disposed in a vertical plane and with the end reaches of the cable lying tangent to the pulley at the point of intersection of said center line with the raceway member 54.

Referring to schematic FIGURE 2 and FIGURE 4, when the center line of the pulley is vertical the direction of force from the wiper motor to the pulley 44 is substantially along the axis of the end portion 37 of the link 33 so as to apply the force tangentially to the periphery of the pulley 44 along said axis of the link. In this way excessive binding and side thrust between the cable and the pulley can be substantially avoided. As best shown in FIGURE 7, as the link 33 is moved to the extreme left-hand position so that the pulley is rolled through an angle of about 90 degrees, the tangent line between the cable and the periphery of the pulley gradually becomes askew with respect to the true tangent to the grooves 56, 57 in the raceway member of the pulley. The amount of skewing becomes greater as the pulley is rotated from the median or center position of FIGURE 6, but for all practical purposes the operative angle of rotation of the pulley generally does not exceed 90 degrees on each side of the median line 67, or a total of 180 degrees.

The links 33, 34 are shown to be relatively straight for illustration purposes only. It is contemplated that the links could have bends or any other shapes desired to work around obstructions as long as the end portions 37, 38 are substantially straight and have their axes substantially aligned with the point of connection of the links with the pin between the links and the crank 36. In this way the direction of applied force from the motor 28 to the cable and pulley is along a substantially straight line forming the axis of the end portion 37 or 38 of the links.

With the applied force from the power unit directed along the axis of the end portion 37, said force is likewise directed along the axis of the cable such that in the median or center position of the pulley, as shown in FIGURE 6, the cable wraps on and off the pulley along a tangent in both the front view of FIGURE 6 and in the top view of FIGURE 4. As the link and cable rotate the pulley to one extreme position, as shown in FIGURE 7, the cable is tangent to the grooves in the pulley still in the front view, but is slightly askew to the grooves in the top view as shown in FIGURE 7. At the center or median position of FIGURE 6, there is practically no interference between the cable and the walls of the pulley grooves 56, 57 while in the extreme position, such as in FIGURE 7, a slight but noncritical amount of interference is produced between the cable and the walls of the grooves in the pulley.

The assembly operates with substantially less wear between the operative parts of the system so that as a whole it is quiter, smoother and substantially trouble-free in use.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. In a motion-transmitting assembly having a power unit, a driven shaft, a pulley member connected with and adapted to drive the shaft, a reciprocally driven substantially rigid link connected with the power unit and having one portion thereof closely associated with said pulley member, the longitudinal axis of said one portion of the link being disposed at an oblique angle with respect to the longitudinal axis of the driven shaft, said pulley member having a central portion and a peripheral portion, the plane of said peripheral portion being disposed at an angle with respect to the plane of said central portion, the axis of said end portion of the link being disposed substantially in the plane of said peripheral portion of said pulley member during a portion of the stroke of said link, and flexible means disposed about and connected to said peripheral portion of said pulley and to said link whereby reciprocation of said link drives said pulley member through said flexible means.

2. In a motion-transmitting assembly having a power unit, a driven shaft, a pulley member connected with and adapted to drive the shaft, a reciprocally driven substantially rigid link connected with the power unit and having one end portion juxtaposed with respect to the periphery of said pulley member, the longitudinal axis of said one end portion of the link being disposed at an oblique angle with respect to the longitudinal axis of the driven shaft, said pulley member having a central portion and a peripheral portion, the plane of said peripheral portion being disposed at an angle with respect to the plane of said central portion, the radially outwardly facing peripheral surface of said pulley member having groove means formed therein, the axis of said end portion of the link lying substantially in the plane of said peripheral portion of said pulley member during a portion of the stroke of said link, and flexible driving means disposed in said groove means and being connected with the pulley member and with the link in a manner whereby reciprocating movement imparted to the link by the power unit causes the flexible means to actuate the pulley member for oscillating the shaft.

3. A motion transmitting device in combination: a power unit, a driven shaft, a pulley-like member connected with and adapted to actuate the shaft, a reciprocally driven substantially rigid link connected with the power unit and having the longitudinal axis of the outer end portion disposed at an oblique angle with respect to the longitudinal axis of the driven shaft, said pulley-like member having a peripheral portion lying in a plane disposed at an oblique angle with respect to the longitudinal axis of the driven shaft, the axis of said end portion of the link lying in said plane of said peripheral portion during the mid-portion of the stroke of said link, and flexible driving means disposed about and connected with the pulley-like member and with the link in a manner whereby reciprocating movement imparted to the link by the power unit causes the flexible means to actuate the pulley-like member and oscillate the shaft.

4. A motion-transmitting device in combination: a power unit, a driven shaft, a pulley-like member connected with and adapted to actuate the shaft, a reciprocally driven substantially rigid link connected with the power unit and having its longitudinal axis disposed at an oblique angle with respect to the longitudinal axis of the driven shaft, said pulley-like member having a peripheral portion lying in a plane disposed at an oblique angle with respect to the longitudinal axis of the driven shaft, said last-named angle being substantially equal to the angle between the link and the shaft, and flexible driving means disposed about and connected with the pulley-like member and with the link in a manner whereby reciprocating movement imparted to the link by the power unit causes the flexible means to actuate the pulley-like member and oscillate the shaft.

5. In a motion-transmitting assembly and in combination: a power unit, a driven shaft, a pulley-like member connected with and adapted to actuate the shaft, a reciprocally driven substantially rigid link connected with the power unit and having the longitudinal axis of one portion disposed at an oblique angle with respect to the longitudinal axis of the driven shaft, said pulley-like member having a peripheral portion lying in a plane disposed at an oblique angle with respect to the longitudinal axis of the driven shaft, the angle between said plane of the peripheral portion and the axis of the driven shaft being substantially equal to the angle between said one portion of the link and the shaft during a part of the reciprocatory movement of the link, flexible driving means disposed about and connected with the pulley-like member and with the link in a manner whereby reciprocating movement imparted to the link by the power unit causes the flexible means to actuate the pulley-like member and oscillate the shaft.

6. A motion-transmitting assembly in combination: a power unit, a driven shaft, a pulleylike member connected with and adapted to actuate the shaft, a reciprocally driven substantially rigid link connected with the power unit and having the longitudinal axis of its outer end portion disposed at an oblique angle with respect to the longitudinal axis of the driven shaft, said pulleylike member having a central portion and a peripheral portion, the plane of said peripheral portion being disposed at an angle with respect to the plane of said central portion, said planes intersecting with each other along a line common with the center line of said pulleylike member, the axis of said outer end portion of the rigid link lying substantially in the plane of said peripheral portion of said pulley during substantially the mid-portion of the stroke of said link, and flexible driving means disposed about and connected with the pulley-like member and with the link in a manner whereby reciprocating movement imparted to the link by the power unit causes the flexible means to actuate the pulleylike member and oscillate the shaft.

7. A motion-transmitting assembly in combination: a power unit, a driven shaft, a pulleylike member connected with and adapted to actuate the shaft, a reciprocally driven substantially rigid link connected with the power unit, a vertical plane containing the longitudinal axis of the outer end portion of the link being disposed at an oblique angle with respect to the longitudinal axis of the driven shaft and intersecting the output end of the power unit, said pulleylike member having a central portion and a peripheral portion, the plane of said peripheral portion intersecting with the plane of said central portion along the center line of said pulleylike member and forming an angle therebetween, the plane containing the axis of said outer end portion of the rigid link substantially coinciding with the plane of said peripheral portion of said pulley during substantially the mid-portion of the stroke of said link, and flexible driving means disposed about and connected with the pulleylike member and with the link in a manner whereby reciprocating movement imparted to the link by the power unit causes the flexible means to actuate the pulleylike member and oscillate the shaft.

8. A motion-transmitting device in combination: an oscillatably driven shaft, a pulleylike member connected with said shaft for movement therewith, a peripheral portion of said pulley lying in a plane obliquely disposed with respect to the axis of said driven shaft, reciprocating substantially rigid actuating means operatively connected with a power unit and with said pulleylike member, one end portion of said actuating means having a longitudinal axis lying in the plane of said peripheral portion of the pulley during a portion of the movement of said actuating means, said plane of the peripheral portion of said pulley coinciding with the longitudinal axis of the end portion of the actuating means and intersecting the output end of the power unit during a portion of the stroke of said actuating means, and flexible means disposed about and connected with the pulleylike member and with spaced-apart portions of the outer end portion of the actuating means whereby movement of the actuating means causes the flexible means to actuate the pulleylike member.

References Cited in the file of this patent

UNITED STATES PATENTS

| | | |
|---|---|---|
| 2,521,983 | Kyle | Sept. 12, 1950 |
| 2,901,764 | Anderson | Sept. 1, 1959 |
| 2,947,185 | Ziegler | Aug. 2, 1960 |

FOREIGN PATENTS

| | | |
|---|---|---|
| 647,006 | France | July 23, 1928 |
| 678,333 | France | Dec. 23, 1929 |